(12) United States Patent
Moir et al.

(10) Patent No.: US 6,315,620 B1
(45) Date of Patent: Nov. 13, 2001

(54) SYSTEM, METHOD, AND DEVICE FOR A PRE-LOADED STRADDLE MOUNTED CONNECTOR ASSEMBLY

(75) Inventors: Michael Bruce Moir, Newbury Park; Virat Thantrakul, La Crescenta; Scott Wesley Baxter, Moorpark; Michael A. Rosales, Jr., Simi Valley, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/066,007

(22) Filed: Apr. 24, 1998

Related U.S. Application Data

(60) Provisional application No. 60/044,806, filed on Apr. 24, 1997.

(51) Int. Cl.[7] ............................... H01R 4/48; H05K 1/00
(52) U.S. Cl. ............................................ 439/862; 439/79
(58) Field of Search .................................. 439/79, 80, 59, 439/862, 66

(56) References Cited

U.S. PATENT DOCUMENTS

| | | |
|---|---|---|
| 3,567,998 | 3/1971 | Ammerman . |
| 3,589,591 | 6/1971 | Schwenn . |
| 4,197,945 | 4/1980 | Sherwood . |
| 4,623,207 | 11/1986 | Sasaki et al. . |
| 5,160,275 | 11/1992 | Nakamura et al. . |
| 5,411,408 | 5/1995 | DiViesti et al. . |
| 5,472,349 | 12/1995 | Dixon et al. . |
| 5,478,260 | 12/1995 | Kaufman et al. . |
| 5,507,657 | 4/1996 | Seto et al. . |
| 5,509,197 | 4/1996 | Stone . |
| 5,575,663 | 11/1996 | Broschard, III et al. . |
| 5,575,690 * | 11/1996 | Eaton ................................... 439/717 |
| 5,644,839 | 7/1997 | Stone . |
| 5,685,739 | 11/1997 | Davis et al. . |
| 5,725,386 | 3/1998 | Davis et al. . |
| 5,746,607 * | 5/1998 | Bricaud et al. ......................... 439/66 |
| 5,893,764 | 4/1999 | Long . |
| 5,944,536 | 8/1999 | Seong et al. . |
| 5,980,273 * | 11/1999 | Yong et al. ............................ 439/79 |
| 5,980,323 * | 11/1999 | Bricaud et al. ....................... 439/630 |

* cited by examiner

Primary Examiner—Brian Sircus
Assistant Examiner—Chandrika Prasad
(74) Attorney, Agent, or Firm—Merchant & Gould PC

(57) ABSTRACT

A system, method, and device for electrical connection is disclosed. The system comprises a leaf-spring connector member having a leaf-spring connector housing and a plurality of leaf-spring elements for carrying electrical signals, and a pad connector member having a base and a plurality of electrically conductive pad elements aligned to be pressed against the plurality of leaf-spring elements. The leaf-spring elements are pre-loaded to exert increased spring forces when compressed by the electrically conductive pad elements, resulting in decreased ohmic resistance between the leaf-spring elements and the electrically conductive pad elements.

18 Claims, 8 Drawing Sheets

SYSTEM, METHOD, AND DEVICE FOR A PRE-LOADED STRADDLE MOUNTED CONNECTOR ASSEMBLY

CROSS-REFERENCE TO RELATED APPLICATIONS

Embodiments of this invention relate to Provisional Application Ser. No. 60/044,806 filed on Apr. 24, 1997. The contents of that application are incorporated by reference herein.

BACKGROUND OF THE INVENTION

1. Field of the Invention

Embodiments of this invention relate generally to printed-circuit board (PCB) connectors, and in particular embodiments, to methods and devices for coupling electrical conductors of physically separate electrical circuits by utilizing pre-loaded leaf-spring elements that exert increased spring forces when compressed by mating conductors, resulting in decreased ohmic resistance between the leaf-spring elements and the mating conductors, and systems incorporating the same.

2. Description of Related Art

In many electronic devices and systems, electrical circuitry is not confined to a single physical structure such as a PCB, but extends over multiple PCBs or other components. While hard-wiring physically dispersed electrical circuitry together with permanent connections such as soldered wires will suffice electrically, such methods of assembly are often impractical from a production or maintenance standpoint. Assembly or disassembly can often be more efficiently achieved by providing connectors on each physically distinct structure which are capable of being mated together or with other components to make the necessary electrical connections, or conversely, de-mated for repairs, maintenance, or upgrades.

Conventional PCB connectors often take the form of pin-and-socket arrangements, where multiple pins in one connector are physically inserted into multiple sockets in another connector. The compressive forces of the socket against the pin makes the physical and electrical connection. Pin-and-socket connectors also generally provide good protection for the pins and sockets, which are often recessed within their separate connector housings to provide protection in both the uncoupled and coupled configurations. However, the friction of the sockets against the pins necessitates high insertion and removal forces, making automated assembly difficult.

Pin-and-socket connectors are often a poor choice when centrally located on PCBs, or in any instance where surface mounting of components is desired to eliminate the need for through-mounting holes or vias which interfere with the routing of circuit traces within the PCB. While certain pin-and-socket connectors can be surface-mounted to eliminate through-mounting vias, their high insertion forces cause other problems. When connectors are surface mounted to the PCB, their solder connections may be an integral part of their securement to the PCB, and mating or de-mating of high insertion force surface mounted pin-and-socket connectors may result in mechanical stress and damage to the solder connections. In extreme cases;, these forces may cause the entire surface mounted connector to be pulled off the PCB. In addition, pin-and-socket connectors require precise alignment, and when several such connectors are located on a PCB, manufacturing and assembly tolerances may prevent the proper mating of all connectors.

Conventional leaf spring connectors solve some of the problems of pin-and-socket connectors. Leaf-spring connectors typically have flat rectangular blades or contacts which protrude above the surface of the connector when unloaded. A spring force is encountered by the blades of a mating connector when compressing the leaf-spring elements. The spring force of the leaf-spring element against the mating connector blades makes the physical and electrical connection. Minimal force is needed to deflect the leaf-spring element from its unloaded position, and thus assembly is simplified. Depending on how the leaf-spring element is formed, these low connection forces may place less mechanical stress on the solder joints of the connector. Additionally, leaf-spring elements are necessarily wide and flat to create the desired spring action, and such contacts are more tolerant of positional errors during assembly.

However, leaf-spring connectors are not without problems. The protrusion of the leaf-spring elements above the connector housing increases the vulnerability of the leaf-spring element to damage caused by snagging other structures during, for example, manufacture, transportation, and installation. In addition, the small forces typically needed to deflect the leaf-spring element from its unloaded position, while desirable from an assembly standpoint, may also lead to increased corrosion of the contacts, high ohmic resistance, and a poor electrical connection, especially in high current applications.

SUMMARY OF THE DISCLOSURE

Therefore, it is an object of embodiments of the invention to provide a system, method, or device for coupling electrical conductors of physic ally separate electrical circuits or components by utilizing pre-loaded leaf-spring elements that exert increased spring forces when compressed by mating conductors, resulting in decreased ohmic resistance between the leaf-spring elements and the mating conductors and improved electrical connections. The improved electrical connectivity also decreases resistive heating and corrosion of the contacts, especially in high current applications.

It is a further object of preferred embodiments of the invention to provide a system, method, or device for coupling electrical conductors of physically separate electrical circuits or components by compressively retaining and pre-loading leaf-spring elements within a leaf-spring connector housing, wherein the retained ends of the leaf-spring elements are hidden within a recess of the connector housing to preclude snagging and damage to the leaf-spring elements by foreign objects.

It is a further object of preferred embodiments of the invention to provide a system, method, or device for coupling electrical conductors of physically separate electrical circuits or components by compressively retaining and pre-loading leaf-spring elements within a leaf-spring connector, wherein the leaf-spring elements are formed and located within the connector such that compression of the contacts results in load forces upon the connector housing instead of solder connections.

These and other objects are accomplished according to a preferred embodiment of the present invention wherein an electrical connector system comprises a leaf-spring connector member having a housing and a plurality of pre-loaded leaf-spring elements for carrying electrical signals, and a pad connector member having a base and a plurality of electrically conductive pad elements. The pre-loaded leaf-spring elements exert increased spring forces when pressed against the electrically conductive pad elements, resulting in decreased ohmic resistance between the leaf-spring elements and the electrically conductive pad elements and improved electrical conduction.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention. For example, while embodiments of the invention can be used with structures other than PCBs (e.g. printed wiring boards, housings, and chassis'), preferred embodiments are described herein primarily with respect to PCB embodiments for purposes of simplifying the disclosure.

In many electronic devices and systems, electrical circuitry is not confined to a single physical structure such as a PCB, but extends over multiple PCBs and other components. While hard-wiring physically dispersed electrical circuitry together with permanent connections will suffice electrically, such methods of assembly are often impractical from a production or maintenance standpoint. Assembly or disassembly can often be more efficiently achieved by providing connectors on each physically distinct structure which are capable of being mated together or with other components to make the necessary electrical connections, or conversely, de-mated for repairs, maintenance, or upgrades.

Leaf spring connectors are sometimes used on PCBs to facilitate this removable interconnection. Leaf-spring connectors typically have flat rectangular blades or contacts protruding from the surface of the connector when unloaded, such that a spring force is encountered by the blades of a mating connector when compressing these leafspring elements.

Figure 1:
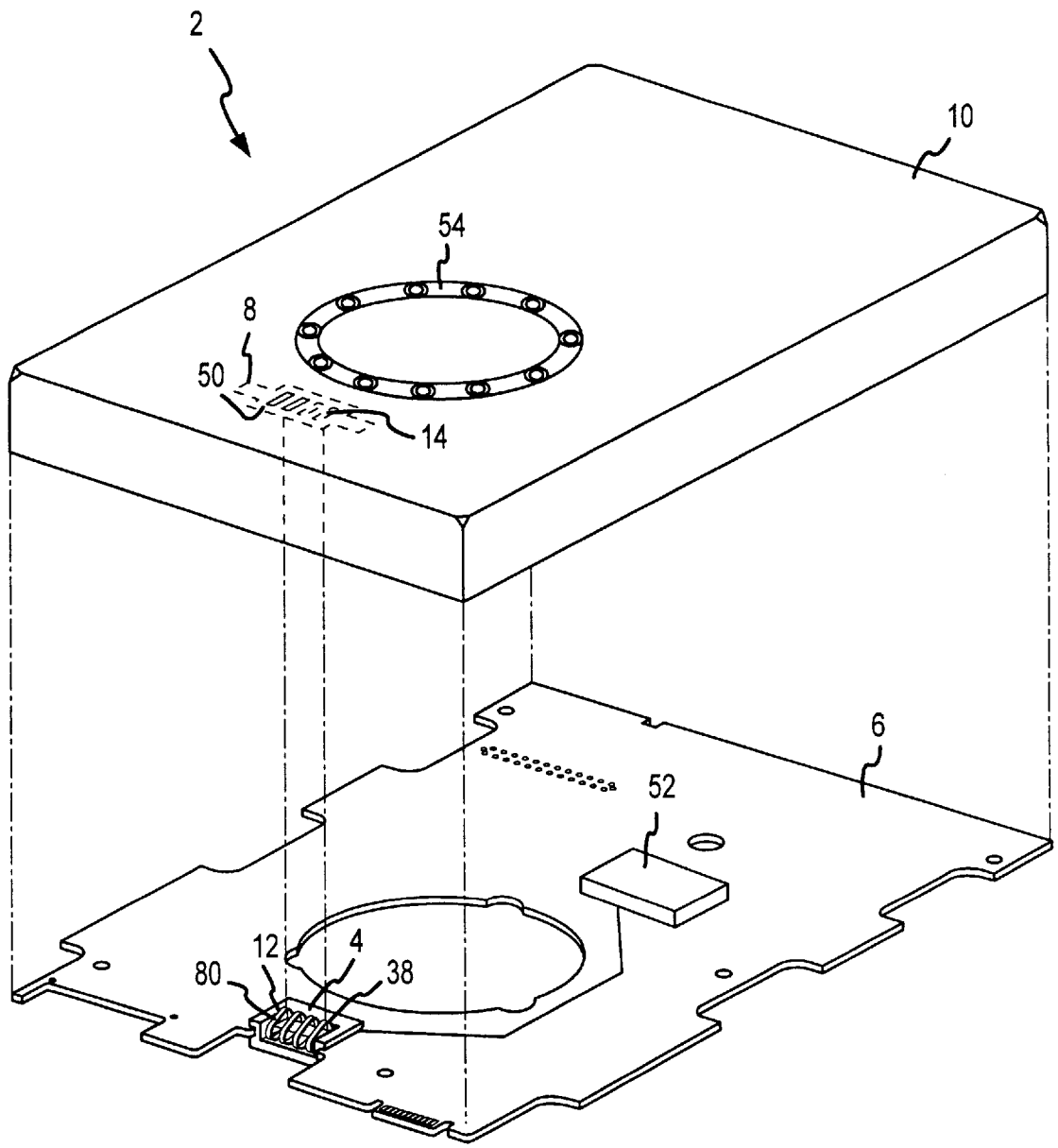
FIG. 1 is an exploded perspective view of an electrical connector system of electrical circuits according to an embodiment of the invention.
Figure 7:
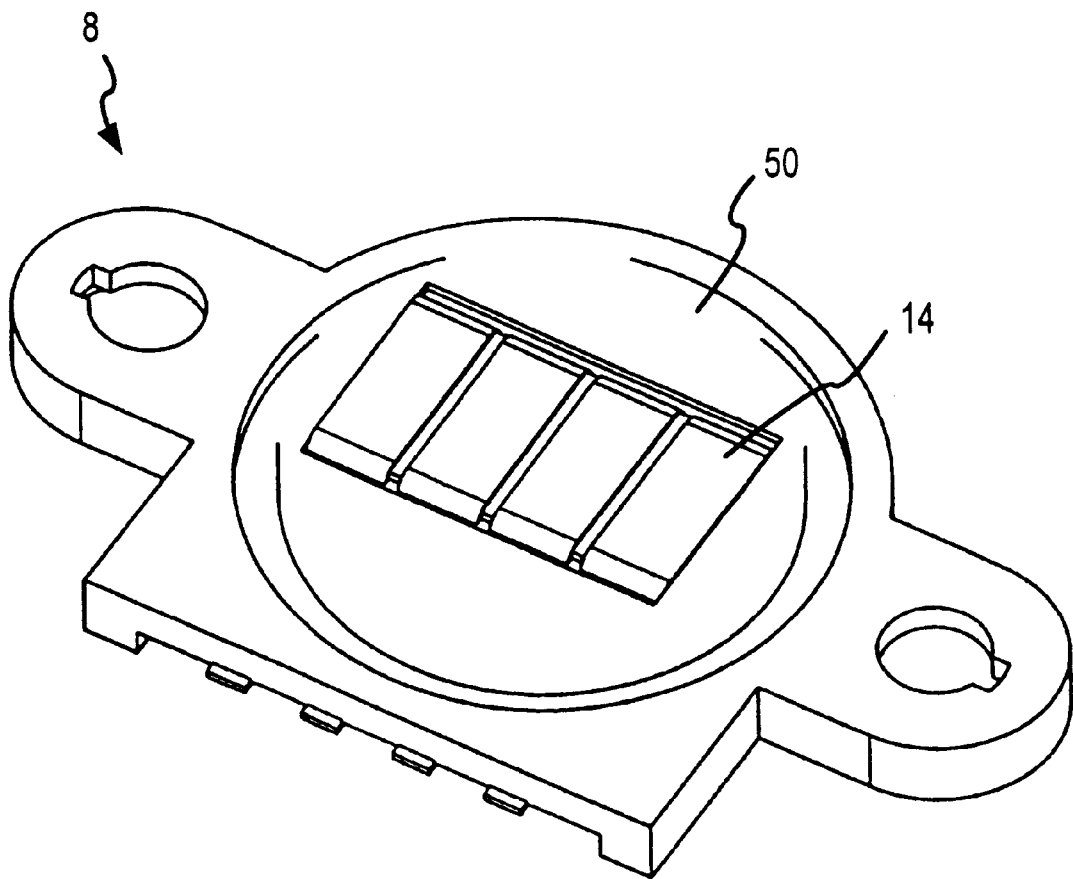
FIG. 7 is a perspective view of a pad connector member according to an embodiment of the invention.

An electrical connector system 2 composed of multiple separately manufacturable structures is shown in FIG. 1. The electrical connector system 2 comprises at least two structures (a PCB 6 and a system housing 10 in the illustrated embodiment) which carry electrical components and which area electrically connectable to each other. A leaf-spring connector member 4 is coupled to one structure (the PCB 6) and a pad connector member 8 is coupled to the other structure (the system housing 10). The pad connector member 8 comprises a pad connector base 50 and electrically conductive pad elements 14. An embodiment of the pad connector member 8 is illustrated in FIG. 7 and is described in more detail below. Referring again to FIG. 1, the leaf-spring connector member 4 comprises a plurality of leaf-spring elements 12 (four in FIG. 1) which are coupled to a first electrical circuit 52 (depicted symbolically in FIG. 1) such that circuit nodes within the first electrical circuit 52 are in electrical communication with the leaf-spring elements 12. A second electrical circuit 54 is coupled to the pad connector member 8 such that circuit nodes within the second electrical circuit 54 are in electrical communication with the electrically conductive pad elements 14.

According to preferred embodiments of the invention, the first electrical circuit 52 is a spindle motor stator commutation driver circuit on the PCB 6, and the second electrical circuit 54 is a spindle motor stator mounted on the system housing 10. During assembly of the electrical connector system 2, the leaf-spring connector member 4 is secured to the PCB 6 and electrically connected to the first electrical circuit 52. The pad connector member 8 is secured to the system housing 10 and electrically connected to the second electrical circuit 54. Then, the PCB 6 is inserted and secured within the system housing 10 such that the leaf-spring elements 12 are contacted and compressed by the electrically conductive pad elements 14 of the pad connector member 8, making the necessary electrical connections between the nodes of the first and second electrical circuits.

Figure 2:
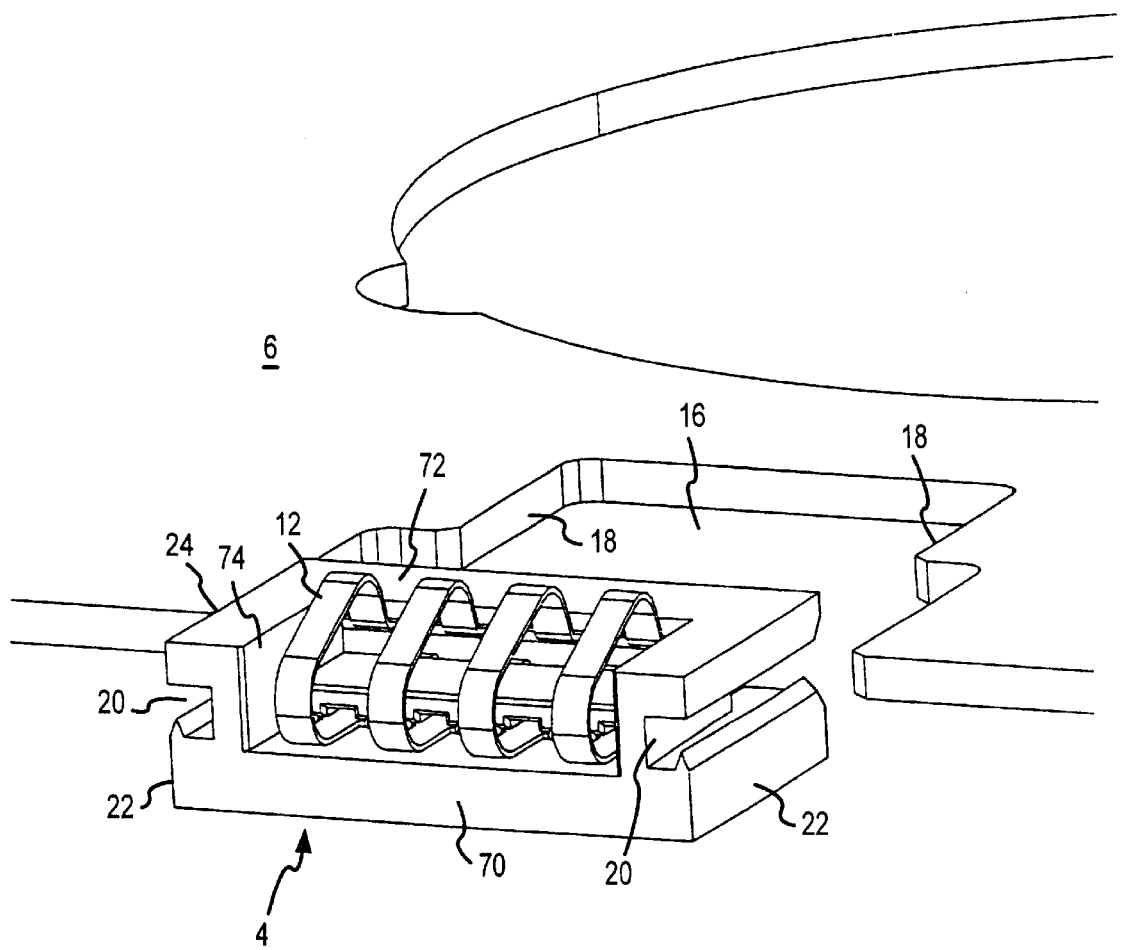
FIG. 2 is a perspective view of a leaf-spring connector member aligned near a notch on a PCB according to an embodiment of the invention.

FIG. 2 is an enlarged view of the leaf-spring connector member 4 positioned to be secured to the PCB 6. As shown in FIG. 2, the leaf-spring connector member 4 comprises a leaf-spring connector housing 24 and a plurality of electrically conductive leaf-spring elements 12. The leaf-spring connector housing 24 comprises a base member 70, a retaining member 72, side members 22, and substantially parallel grooves 20 formed in the side members 22. At least one first opening 74 in the leaf-spring connector housing 24 exposes a portion of each of the electrically conductive leaf-spring elements 12. In preferred embodiments of the invention, the leaf-spring connector housing 24 is formed as a single, unitary structure, and is made of electrically insulating materials such as plastics or ceramics.

The PCB 6 comprises a planar sheet of material whose thickness is approximately the height of the grooves 20 in the side members 22 of the leaf-spring connector housing 24. A substantially rectangular notch 16 is formed on one side of the PCB 6, creating substantially parallel inward-facing tongues 18 which are received in grooves 20. The grooves 20 are slidable over the tongues 18 to produce a tongue-in-groove straddle mount of the leaf-spring connector member 4 to the PCB 6, as illustrated in FIG. 1.

Figure 3:
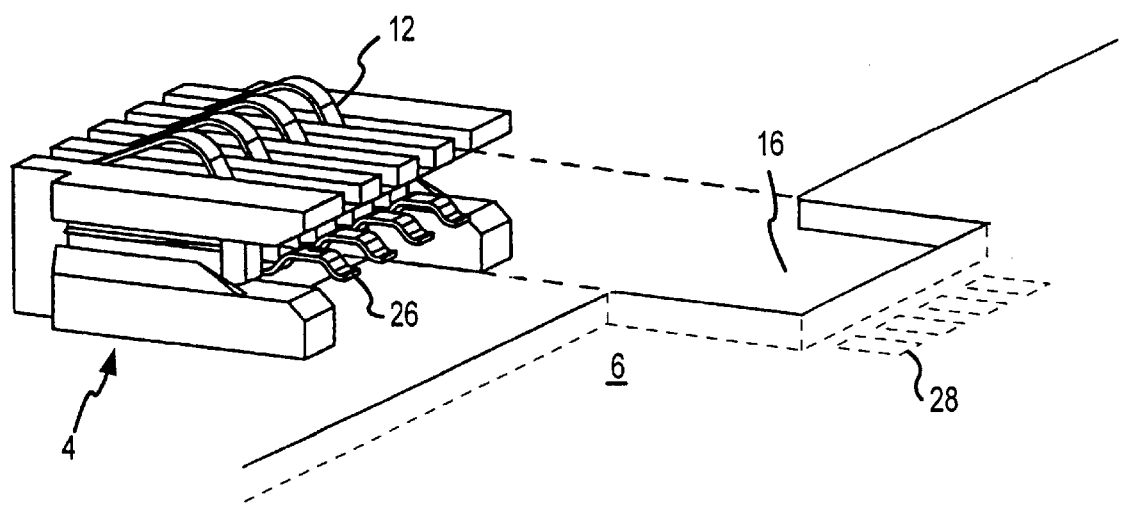
FIG. 3 is a perspective view of a leaf-spring connector member aligned near a notch on a PCB, illustrating the ends of the leaf-spring elements and PCB pads (shown in phantom) according to an embodiment of the invention.

Referring to FIG. 3, the leaf-spring connector member 4 includes a plurality of securable contact ends 26 which are arranged to electrically connect with a corresponding plurality of electrically conductive PCB pads 28 (shown in phantom in FIG. 3) on the underside of PCB 6, upon the leaf-spring connector member 4 being received within the notch 16. Once the leaf-spring connector member 4 is fully inserted into the notch 16, the securable contact ends 26 of the leaf-spring elements 12 place a compressive force on, and make frictional contact with, the electrically conductive PCB pads 28. In preferred embodiments of the invention, the securable contact ends 26 are soldered to the electrically conductive PCB pads 28 for electrical connectivity, while structural connectivity is provided (primarily, or more preferably, entirely) by the tongue-in-groove straddle mounting of the leaf-spring connector member 4 to the PCB 6.

Figure 4:
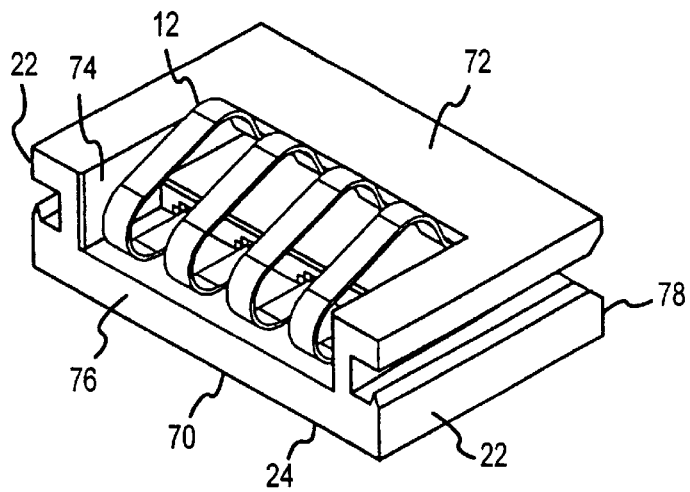
FIG. 4 is a perspective views of a leaf-spring connector member according to an embodiments of the invention.

FIG. 4 illustrates an embodiment of the leaf-spring connector member 4. The electrically conductive leaf-spring elements 12 are exposed within the first opening 74, and are protected on five sides by the base member 70, side members 22, rear wall 76, and front wall 78. The leaf-spring elements 12 only protrude beyond the surfaces of the leaf-spring connector housing 24 at the retaining member 72.

Figure 5:
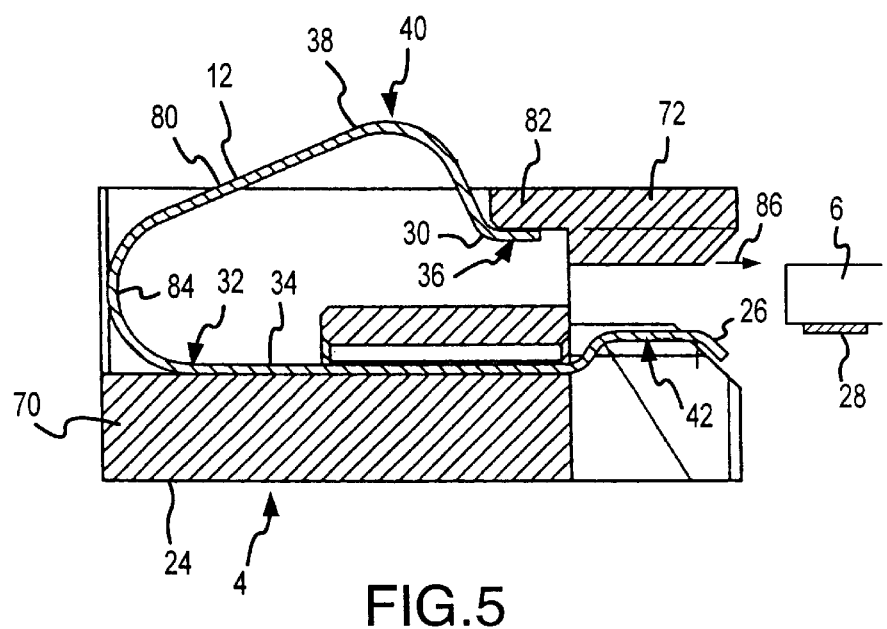
FIG. 5 is a cross-sectional view of a leaf-spring connector member positioned near a PCB according to an embodiment of the invention.
Figure 6A:
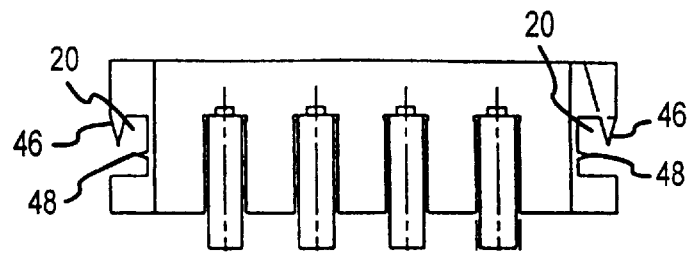
FIGS. 6a, 6b, 6c, and 6d are rear, side, top, and front views, respectively, of a leaf-spring connector member according to an embodiment of the invention.
Figure 6B:
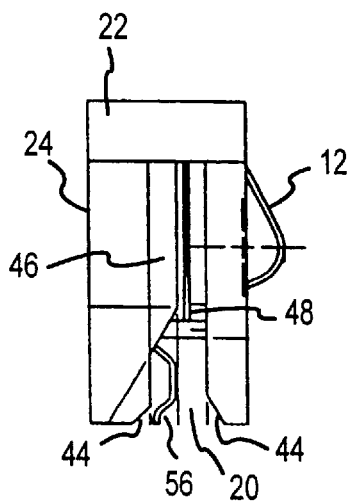
Figure 6C:
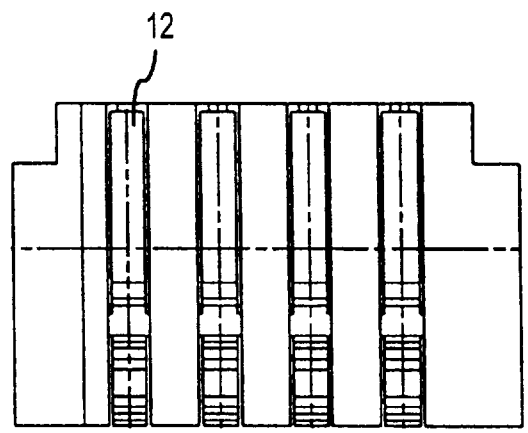
Figure 6D:
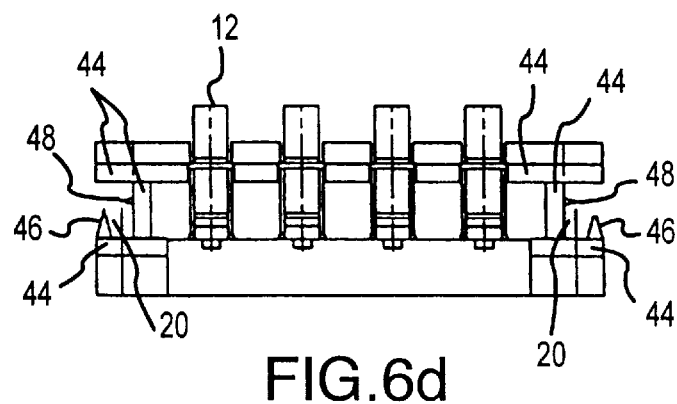

FIG. 5 is a cross-sectional view of an embodiment of a leaf-spring connector member 4. Referring to FIG. 5, the retaining member 72 includes a lip 82 for retaining leaf-spring elements 12. Each leaf-spring element 12 in the leaf-spring connector member 4 comprises a retained end 30, an exposed length portion 80, a first bend which forms an apex 38 between the exposed length portion 80 and the retained end 30, a securable contact end 26, and a footing portion 34 between the exposed length portion 80 and the securable contact end 26. Each leaf-spring element 12 is bent against its natural state to defined a second bend 84 between the exposed length portion 80 and the footing portion 34 such that the retained end 30, apex 38, and exposed length portion 80 are positioned over the footing portion 34. The natural spring force created by the second bend 84 urges the retained end 30 against the lip 82 and urges the footing portion 34 against the base member 70. By retaining the retained ends 30 of the leaf-spring elements 12 within the leaf-spring connector housing 24, the retained ends 30 are protected from being snagged by foreign objects (not shown).

When the apexes 38 are contacted by the electrically conductive pad elements 14 (not shown in FIG. 5) of the pad connector member 8 (not shown in FIG. 5), a retained end compression force 40 is required to compress the retained ends 30 toward the footing portions 34 and increase the second bends 84. The retained end compression forces 40 needed to compress the retained ends 30, when the leaf-spring elements 12 are pre-loaded, are greater than the forces needed if the retained ends 30 were unloaded, due to the presence of the retained end pre-load spring forces 36. The increased retained end compression forces 40 required to compress the leaf-spring elements 12 when the electrically conductive pad elements 14 (not shown in FIG. 5) press against the apexes 38 decreases the ohmic resistance between the two and improves electrical connectivity between the leaf-spring elements 12 and the electrically conductive pad elements 14.

Referring to FIG. 1, the pad connector member 8 may be coupled to a system housing 10 or another PCB (not shown in FIG. 1). By aligning the electrically conductive pad elements 14 on the pad connector member 8 with the exposed length portions 80 and apexes 38 of the leaf-spring elements 12, and pressing the PCB 6 together with the system housing 10 or other PCB (not shown in FIG. 1), electrical connectivity between the first electrical circuit 52 and the second electrical circuit 54 can be achieved.

Referring again to FIG. 5, the securable contact end 26 of each leaf-spring element 12 is in an unloaded position prior to insertion of the leaf-spring connector member 4 into the notch 16 (not shown in FIG. 5) of the PCB 6. However, when the leaf-spring connector member 4 is inserted into the notch of the PCB 6, the securable contact ends 26 contact the electrically conductive PCB pads 28 and are slightly deflected so as to apply a securable contact end spring force 42 to the electrically conductive PCB pads 28. The application of the securable contact end spring force 42 upon the electrically conductive PCB pads 28 decreases the ohmic resistance and improves electrical connectivity between the securable contact ends 26 and the electrically conductive PCB pads 28. In preferred embodiments of the invention, solder may be applied to the securable contact ends 26 and electrically conductive PCB pads 28.

When retained end compression force 40 is applied to the apex 38, the retained end 30 compresses, the second bend 84 increases, and a connector load force 32 is applied by the footing portion 34 to the base member 70 of the leaf-spring connector housing 24 in a direction substantially perpendicular to the direction of insertion 86 of the leaf-spring connector member 4. Because the leaf-spring connector housing 24 is securably straddle-mounted to the PCB 6, the connector load force 32 is transmitted directly to the PCB 6 and no mechanical stress is applied to the securable contact end 26, preventing damage to any solder connection made between the securable contact end 26 and the electrically conductive PCB pads 28.

In embodiments of the present invention, automated machinery may be utilized to slidably insert the leaf-spring connector member 4 onto the PCB 6. In such automated assembly processes it is preferred that components to be assembled have minimum positional error and/or the ability for some self-alignment. FIGS. 6a through 6d illustrate an embodiment of the present invention which has self-alignment capability. Referring to FIGS. 6a through 6d, the leading edges 44 of the grooves 20 in the side members 22 of the leaf-spring connector housing 24 are chamfered so that the tongues 18 (not shown in FIG. 6) of the PCB 6 (not shown in FIG. 6) will deflect off the chamfered edges if misaligned and properly enter the grooves. The tips 56 of the securable contact ends 26 are also bent to more easily receive the PCB 6.

The walls of the grooves 20 have at least one malleable chamfered vertical rib 46 projecting vertically within the grooves 20. The vertical rib 46 contacts the tongues 18 as they are inserted further into the grooves 20, raising up the tongues 18 to provide additional correction of vertical misalignment. The walls of the grooves 20 also have at least one malleable chamfered horizontal rib 48 projecting horizontally within the grooves 20 to correct for horizontal misalignment. Although one vertical rib 46 and one horizontal rib 48 are shown in the drawings, embodiments of the invention may employ more than one vertical and horizontal rib 46 and 48 within each groove 20. The malleable chamfered vertical and horizontal ribs 46 and 48 narrow the grooves 20 to such an extent that as the tongues 18 are slidably guided into the grooves 20, the ribs abut the tongues 18 and are necessarily compressed and deformed to accommodate the tongues 18, increasing the frictional self-retention of the tongues 18 within the grooves 20.

Figure 8:
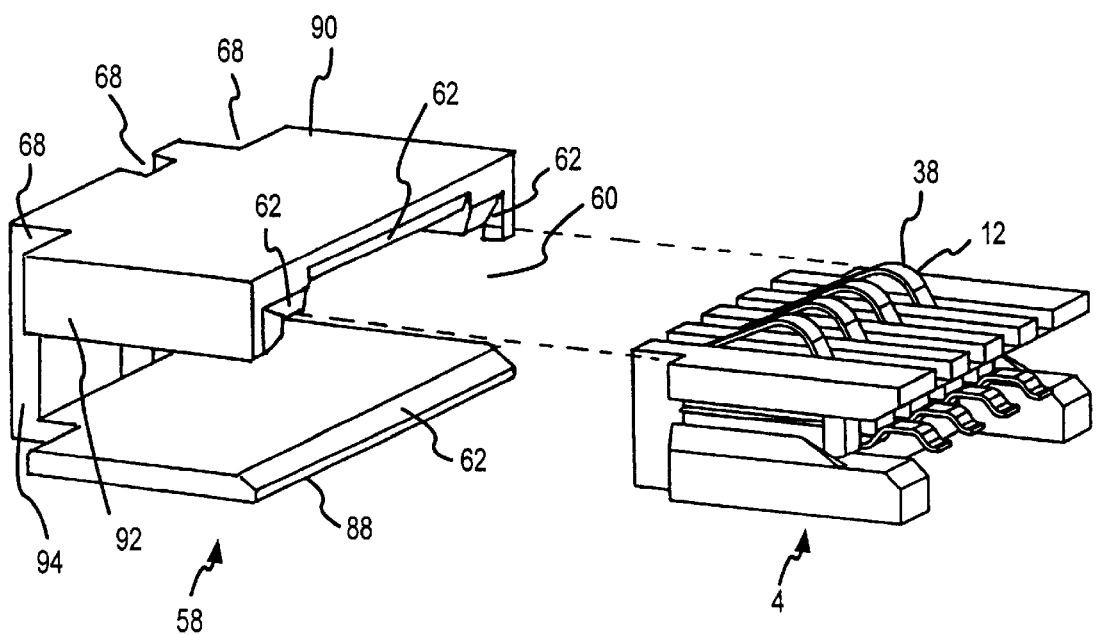
FIG. 8 is a perspective view of a cap positioned to receive a leaf-spring connector member according to embodiments of the invention.
Figure 9A:
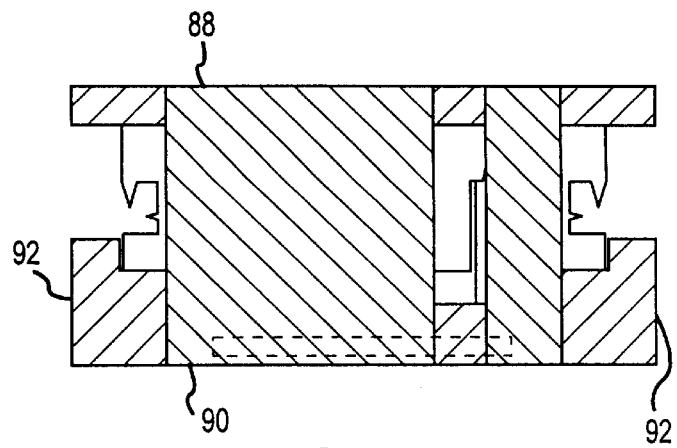
FIGS. 9a, 9b, 9c, and 9d are rear, side, top, and front views, respectively, of a cap according to an embodiment of the invention.
Figure 9B:
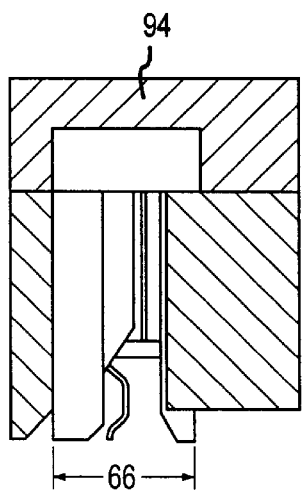
Figure 9C:
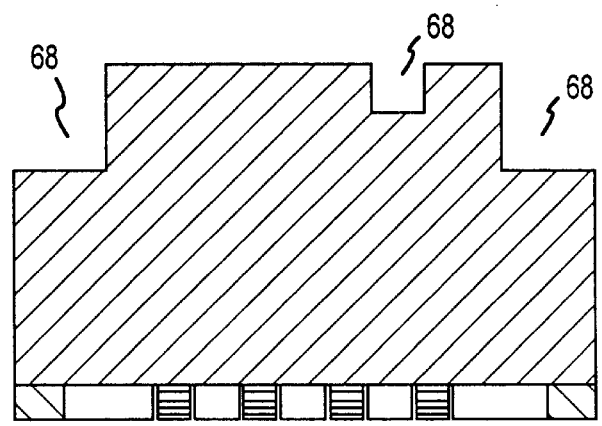
Figure 9D:
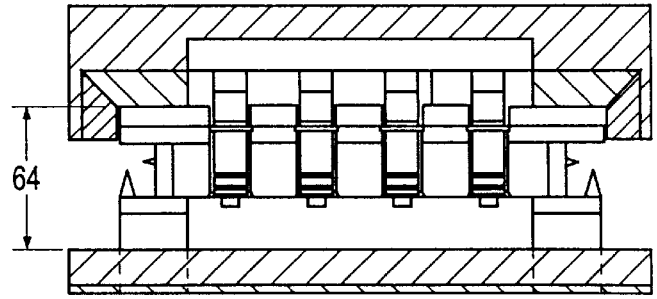

In automated assembly systems utilizing embodiments of the invention, leaf-spring connector members 4 may be delivered to the notch 16 on the PCB 6 by feeder tubes (not shown). Proper stacking and protection of leaf-spring connector members 4 within these tubes is essential for smooth automated operation. In an embodiment of the invention shown in FIG. 8, caps 58 are installed over the leaf-spring connector members 4 for proper stacking in the feeder tubes and for protecting the exposed apexes 38 of the leaf-spring elements 12 during, for example, shipping, storing, installation on a PCB, and following such installation. The cap 58 is dimensioned to fit the feeder tubes, and may have indentations and surface formations 68 for alignment in the feeder tubes or use with other automated machinery.

In an embodiment of the invention, the cap 58 has a bottom wall 88, a top wall 90 with partial side walls 92, and a back wall 94 connecting top and bottom walls 90 and 88. The space between the top and bottom walls 90 and 88, at the cap front, defines a mouth 60 for receiving a leaf-spring connector member 4. The mouth 60 has chamfered edges 62 to slidably receive the leaf-spring connector member 4 and provide a measure of self-alignment of the leaf-spring connector member 4 to the cap 58. The cap 58 is made of a plastic or other suitable material and formed such that the mouth height 64, shown in FIG. 9, is slightly less than the leaf-spring connector housing height 66. As the leaf-spring connector member 4 is slidably inserted into the cap 58, the back wall 94 of the cap 58 flexes, widening the mouth height 64 to accommodate the leaf-spring connector member 4. The flexing of the back wall 94 causes the cap 58 to apply compressive force against the leaf-spring connector member 4 and securably retain the leaf-spring connector member 4 within the cap 58 between the top and bottom walls 90 and 88.

In embodiments of the invention, additional automated assembly steps may include the insertion of the PCB 6 into the system housing 10, as depicted in FIG. 1. In such an automated step, alignment of the leaf-spring elements 12 with the electrically conductive pad elements 14 is necessary. Wide, flat leaf-spring elements 12, liberally spaced, allow for proper coupling of the leaf-spring elements 12 to the electrically conductive pad elements 14 even with a certain amount of misalignment.

The above embodiments of the invention therefore provide advantages in the broad categories of electrical connectivity and manufacturability. The use of pre-loaded leaf-spring elements allows the coupling of electrical conductors of physically separate electrical circuits or components with increased spring forces, decreased ohmic resistance between the leaf-spring elements and the mating conductors and improved electrical connections. The improved electrical connectivity also decreases resistive heating and corrosion of the contacts, especially in high current applications.

In addition, embodiments of the invention increase the reliability of assembly processes. Leaf-spring elements are retained within a recess of the connector housing to preclude snagging and damage to the leaf-spring elements by foreign objects, and are formed and located within the connector such that compression of the leaf-spring elements results in load forces upon the connector housing instead of solder connections. Chamfered leading edges of grooves in the connector, and chamfered ribs within the grooves, aid in self-alignment of the connector and increase tolerance to positional errors during insertion of the connector onto structures like PCBs. Wide, flat leaf-spring elements also are more tolerant of positional errors when the leaf-spring connector and pad connector are pressed together. Finally, use of caps over the connector housing protect the connectors and allow the connectors to be used in the feeder tubes of automated assembly systems.

The foregoing description of preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed:

1. An electrical connector system comprising:
    a first pad connector member having a plurality of primary electrically conductive pad elements;
    a second pad connector member having a plurality of secondary electrically conductive pad elements positioned along an edge of a planar support structure; and
    a straddle-mount electrical connector comprising:
        a plurality of electrically conductive leaf-spring elements configured for alignment with the plurality of primary pad elements, each leaf-spring element including an exposed contact portion, a retained end adjacent the exposed contact portion, an elongated footing portion, and a spring-biased contact end adjacent the elongated footing portion; and
        a housing having a base member, opposing side members and a retaining member extending between the opposing side members, the base member supporting substantially the entire length of the elongated footing portion of each leaf-spring element, and the retaining member including a lip securing the retained end of each leaf-spring element to allow the exposed contact portion of each leaf-spring element to extend above the housing, the opposing side members defining substantially parallel outward-facing grooves for receiving inward-facing parallel edges of the planar support structure to provide a straddle-mount connection of the housing to the planar support structure, and the spring-biased contact ends extending forward from the base member to slidably engage the secondary pad elements as the substantially parallel outward-facing grooves receive the inward-facing parallel edges of the planar support structure, the spring-biased contact ends pressing against the secondary pad elements with a spring force to facilitate frictional contact with the secondary pad elements.

2. The electrical connector system of claim 1, wherein the opposing side members of the housing extend forward from the base member to a greater extent than the spring-biased contact ends to protect the spring-biased contact ends prior to connecting the housing to the planar support structure.

3. The electrical connector system of claim 2, wherein the leaf-spring elements are pre-loaded by bending each leaf-spring element against its natural state to define a bend between the exposed contact portion and the elongated footing portion such that the retained end of each leaf-spring element is urged against the housing lip and the elongated footing portion of each leaf-spring element is urged against the housing base member by the natural spring force of the leaf-spring element.

4. The electrical connector system of claim 2, wherein leading openings of the substantially parallel outward-facing grooves are chamfered for self-alignment of the inward-facing parallel edges of the planar support structure when the inward-facing parallel edges are received within the outward-facing grooves.

5. The electrical connector system of claim 2, wherein the substantially parallel outward-facing grooves further include:
   a malleable vertical rib for vertical alignment and self-retention of the housing to the inward-facing parallel edges of the planar support structure; and
   a malleable horizontal rib for horizontal alignment and self-retention of the housing to the inward-facing parallel edges of the planar support structure.

6. The electrical connector system of claim 5, wherein:
   each vertical rib is chamfered for self-alignment of the planar support structure when the inward-facing parallel edges of the planar support structure are received within the outward-facing grooves; and
   each horizontal rib is chamfered for self-alignment of the planar support structure when the inward-facing parallel edges of the planar support structure are received within the outward-facing grooves.

7. The electrical connector system of claim 2, further comprising:
   a protective cap including a top surface, a bottom surface, a rear surface and partial side walls defining an open mouth at a front end of the protective cap for receiving substantially the entire housing and covering the exposed contact portions of the leaf-spring elements.

8. The electrical connector system of claim 7, wherein the partial side walls of the protective cap contact an outer surface of each of the opposing side members of the connector housing to center the connector housing within the open mouth of the protective cap.

9. The electrical connector system of claim 8, wherein the partial side walls of the protective cap extend vertically from one of the top surface and the bottom surface of the protective cap to define a gap with the other one of the top surface and the bottom surface of the protective cap, the gap having a height dimension greater than a height dimension of the outward-facing grooves formed in the opposing side members of the connector housing to prevent interfering with the straddle-mount connection of the connector housing to the planar support structure.

10. The electrical connector system of claim 9, wherein a height dimension between the top surface and the bottom surface of the protective cap is smaller than a height dimension between the base member of the connector housing and an apex of the exposed contact portions of the leaf-spring elements to compress the leaf-spring elements and retentively hold the connector within the open mouth of the protective cap.

11. The electrical connector system of claim 10, wherein the rear surface of the protective cap defines an indentation for properly aligning the protective cap during automated assembly of the straddle-mount electrical connector to the planar support structure.

12. A method of attaching a straddle-mount electrical connector to a planar support structure, the connector including a housing having a base member, opposing side members and a retaining member extending between the opposing side members, the opposing side members defining substantially parallel outward-facing grooves, the method comprising the steps of:
   retaining a plurality of electrically conductive, pre-loaded leaf-spring elements within the housing, each leaf-spring element including an exposed contact portion extending above the retaining member of the connector housing and a spring-biased contact end extending forward from the base member between the opposing side members of the connector housing;
   inserting the connector housing within a protective cap, the protective cap including a top surface, a bottom surface, a rear surface and partial side walls defining an open mouth for receiving the connector housing, the top surface of the cap having a length dimension sufficient to cover the exposed contact portions of the leaf-spring elements, and the connector housing oriented within the protective cap so that the outward facing grooves and the spring-biased contact ends extend from the open mouth of the cap;
   aligning the protective cap with a notch defined in the planar support structure, the notch defining inward-facing parallel edges separated by a distance substantially equal to a distance separating the outward-facing grooves in the opposing side members of the connector housing;
   pushing the rear surface of the protective cap toward the notch to fit the outward-facing grooves of the connector side members over the inward-facing edges of the planar support structure and produce a tongue-in-groove straddle-mount attachment of the connector to the planar support structure;
   sliding the spring-biased contact ends over a plurality of electrically conductive pad elements formed on a surface of the planar support structure adjacent a leading edge of the notch;
   vertically deflecting the spring-biased contact ends upon contact with the electrically conductive pad elements to create a compressive force between the spring-biased contact ends and the pad elements of the planar support structure; and
   removing the cap from the connector to uncover the exposed contact portions of the leaf-spring elements.

13. A method as defined in claim 12, further comprising the step of soldering the spring-biased contact ends to the conductive pad elements after the step of removing the cap from the connector.

14. A method as defined in claim 12, wherein the step of inserting the connector housing within a protective cap further comprises the step of engaging the partial side walls of the protective cap with the opposing side members of the connector housing to center the connector housing within the open mouth of the protective cap.

15. A method as defined in claim 14, wherein the partial side walls of the protective cap extend vertically from one of the top surface and the bottom surface of the protective cap to define a gap with the other one of the top surface and the bottom surface of the protective cap, the gap having a height dimension greater than a height dimension of the outward-facing grooves formed in the opposing side members of the connector housing to prevent the protective cap from interfering with the tongue-in-groove straddle-mount attachment of the connector to the planar support structure.

16. A method as defined in claim 12 wherein:
   a height dimension between the top surface and the bottom surface of the protective cap is smaller than a height dimension between the base member of the connector housing and an apex of the exposed contact portions of the leaf-spring elements; and
   the step of inserting the connector housing within the protective cap further comprises compressing the leaf-spring elements to retentively hold the connector within the open mouth of the protective cap.

17. A method as defined in claim 12, further comprising the steps of:
   inserting a plurality of the straddle-mount electrical connectors within a plurality of the protective caps; and stacking the plurality of protective caps on top of one another to facilitate automated assembly of the plurality of straddle-mount electrical connectors to a plurality of planar support structures.

18. A protective cap for a straddle-mount electrical connector, the connector having a base member, opposing side members and a retaining member extending between the opposing side members, the opposing side members defining substantially parallel outward-facing grooves for receiving inward-facing parallel edges of a planar support structure to provide a straddle-mount connection between the connector and the planar support structure, the connector further including a plurality of conductive leaf-spring elements, each leaf-spring element including an exposed contact portion extending above the retaining member of the connector and a spring-biased contact end extending forward from the base member between the opposing side members of the connector, the protective cap comprising a top surface, a bottom surface, a rear surface and partial side walls defining an open mouth for receiving the connector, and wherein:

the top surface extends from the rear surface of the protective cap and is adapted to cover the exposed contact portions of the leaf-spring elements when the connector is inserted within the open mouth of the protective cap;

a height dimension between the top surface and the bottom surface of the protective cap is smaller than a height dimension between the base member of the connector and an apex of the exposed contact portions of the leaf-spring elements so that the leaf-spring elements are compressed to retentively hold the connector when the connector is inserted within the open mouth of the protective cap; and the partial side walls of the protective cap extend vertically from one of the top surface and the bottom surface of the protective cap to define a gap with the other one of the top surface and the bottom surface of the protective cap, the gap having a height dimension greater than a height dimension of the outward-facing grooves formed in the opposing side members of he connector to prevent interfering with the straddle-mount connection when the connector is inserted within the open mouth of the protective cap and the combination connector and protective cap are engaged with the planar support structure.

* * * * *